United States Patent [19]
Alter

[11] Patent Number: 4,789,202
[45] Date of Patent: Dec. 6, 1988

[54] INFLATABLE SEAT CUSHION

[76] Inventor: Roy H. Alter, 127 N. Gardner St., Los Angeles, Calif. 90036

[21] Appl. No.: 72,511

[22] Filed: Jul. 13, 1987

[51] Int. Cl.⁴ ............................ A47C 7/02; A47C 7/40
[52] U.S. Cl. .................................... 297/284; 128/78; 297/DIG. 3; 297/253
[58] Field of Search .................. 5/454, 449, 441, 446, 5/447, 432, 433; 297/284, 253, DIG. 3, 224; 128/78

[56] References Cited

U.S. PATENT DOCUMENTS

| | | | |
|---|---|---|---|
| 2,734,556 | 2/1956 | Hebrank | 297/284 |
| 2,822,033 | 2/1958 | Dixon | 297/284 |
| 3,540,776 | 11/1970 | Wilson | 297/284 |
| 3,757,366 | 9/1973 | Sacmer | 297/453 |
| 3,974,827 | 8/1976 | Bodeen | 5/446 |
| 4,471,993 | 9/1984 | Watson | 297/284 |
| 4,518,200 | 5/1985 | Armstrong | 297/DIG. 3 |
| 4,541,670 | 9/1985 | Morgenstern et al. | 297/284 |

FOREIGN PATENT DOCUMENTS

| | | | |
|---|---|---|---|
| 406319 | 12/1967 | Australia | 297/284 |
| 0128534 | 12/1984 | European Pat. Off. | 297/284 |
| 754248 | 8/1956 | United Kingdom | 297/DIG. 3 |

*Primary Examiner*—Alexander Grosz
*Attorney, Agent, or Firm*—Keith D. Beecher

[57] ABSTRACT

An inflatable cushion for motor cars, vans, recreational vehicles and the like, and which has general application to provide comfortable seating on rough, hard, cold or hot surfaces. The cushion includes an inflatable member mounted in the back section and positioned to provide support at the lower lumber region of the back of the individual seated on the cushion, and which is adjustable to the particular needs of that individual.

7 Claims, 2 Drawing Sheets

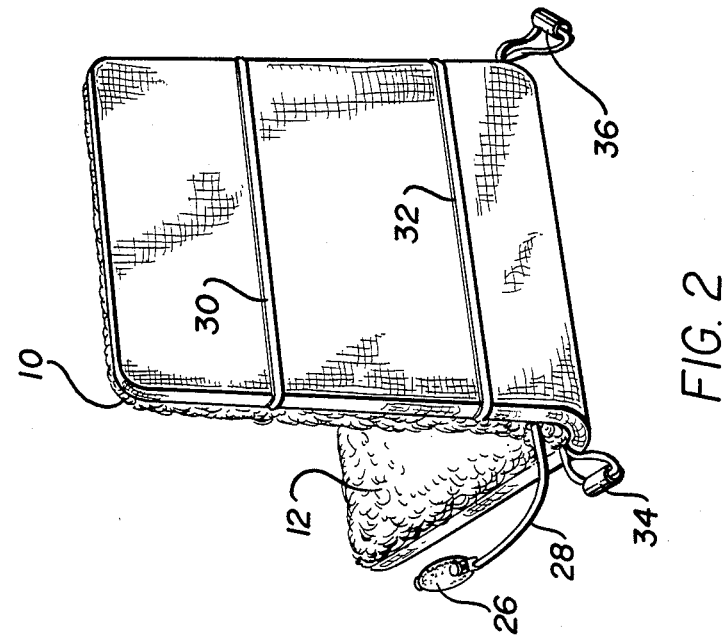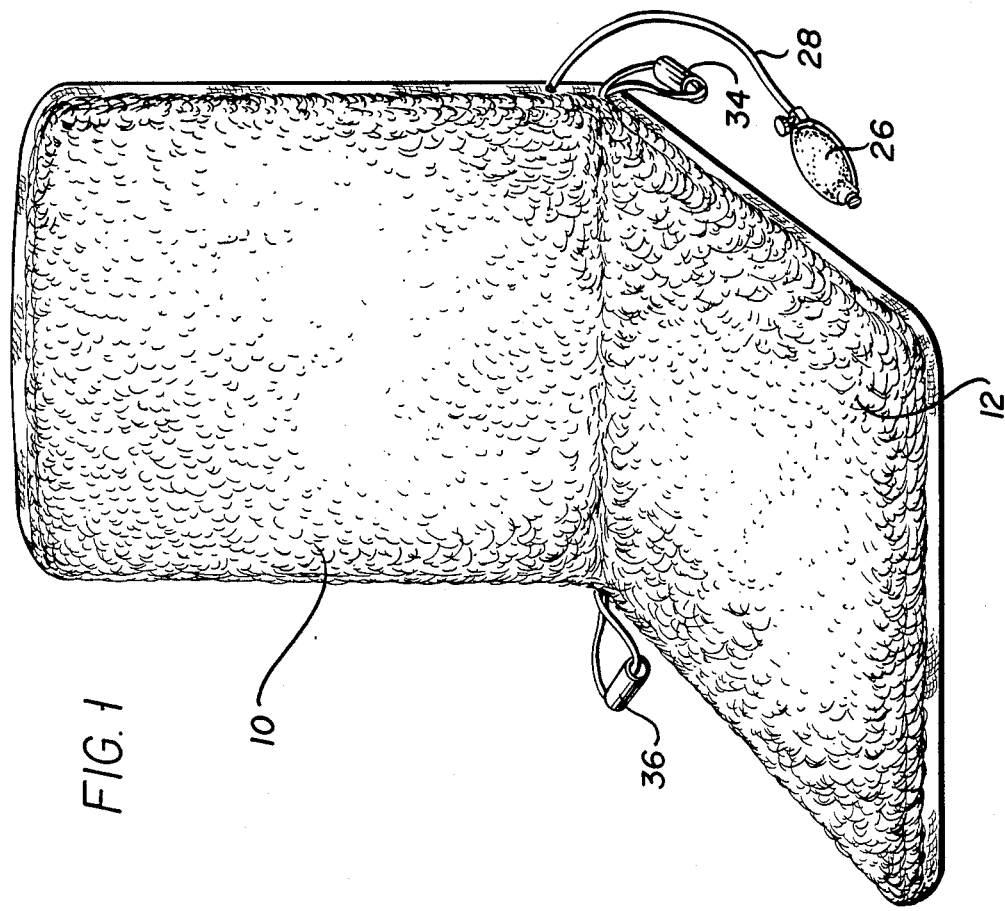

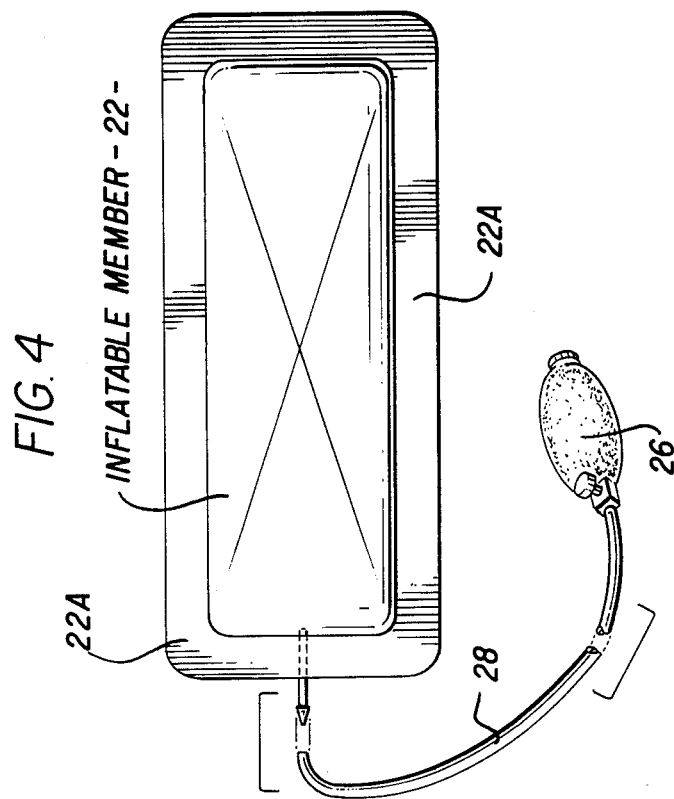
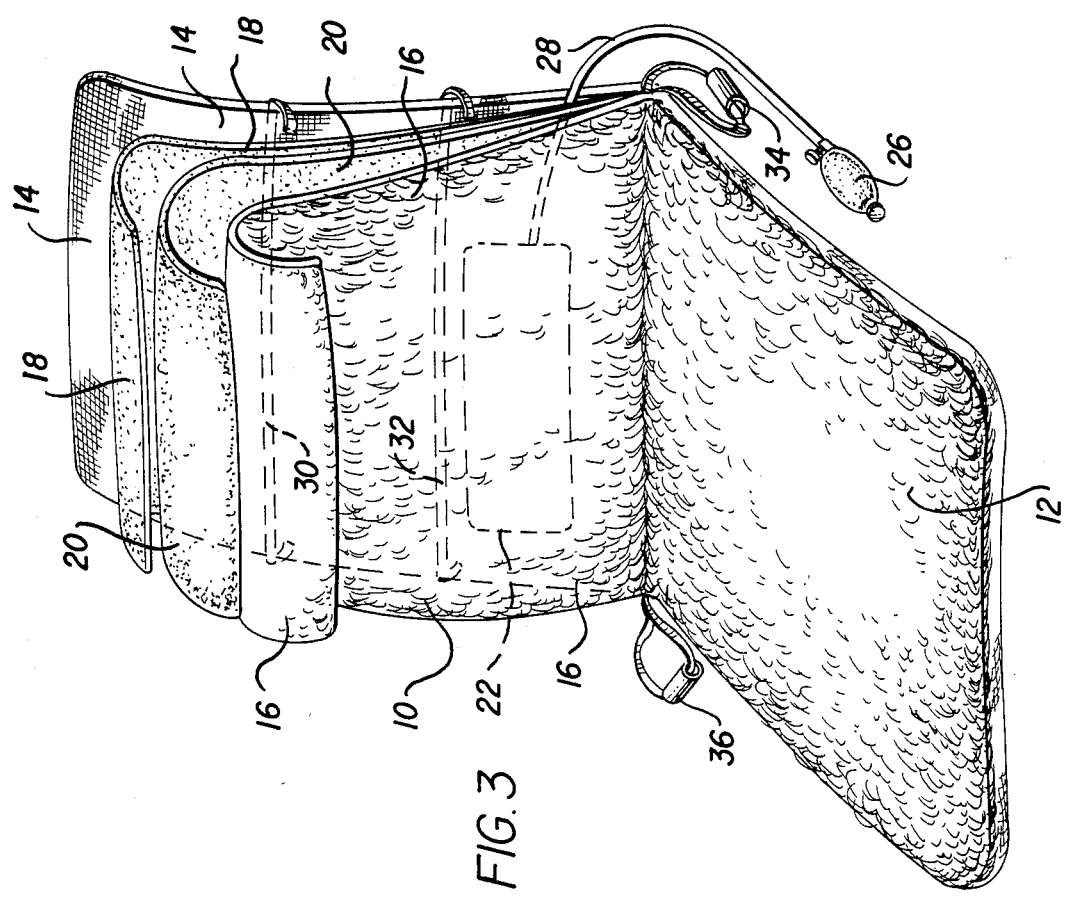

INFLATABLE SEAT CUSHION

BACKGROUND OF THE INVENTION

An inflatable seat cushion which finds particular utility in motor cars, vans, trucks, recreational vehicles, and the like, and generally wherever it is desired to provide comfortable seating on hard, rough, hot, or cold surfaces over prolonged periods of time.

The cushion assembly may be constructed to be easily mountable on bucket or bench seats in a motor vehicle.

The cushion is economical in its construction, simple to operate, and it requires little or no maintenance. Moreover, it is easy to store. It is self-contained and readily portable.

The cushion, in the embodiment to be described, is constructed of a fabric casing filled, for example, with polyurethane foam, a soft wire grid, or other appropriate resilient material.

The cushion is provided with a seat section and a back section hinged to one another. An inflatable bladder is mounted in the back section to be positioned adjacent to the lower lumbar region of the back of the user.

A hand-operated pump is provided for inflating the bladder to a size tailored to the individual using the cushion. The pump is preferably equipped with a quick release pushbutton for fast deflation of the bladder.

The cushion may be reversible. One side of the cushion may be covered with simulated sheepskin, if so desired.

The embodiment to be described is provided with elastic straps and tuck-in bottom restraints to insure proper placement of the cushion on the seat of the vehicle in which it is used, and to control movements of the cushion.

BRIEF DESCRIPTION OF THE DRAWINGS

FIG. 1 is a front perspective view of a cushion assembly comprising one embodiment of the invention;

FIG. 2 is a rear perspective view of the assembly of FIG. 1, shown on a somewhat reduced scale;

FIG. 3 is a perspective view, like FIG. 1, but with various components of the cushion assembly turned down for purposes of explanation; and FIG. 4 is a representation of an inflatable member mounted in the cushion assembly.

DETAILED DESCRIPTION OF THE ILLUSTRATED EMBODIMENT

The cushion assembly of the invention, as shown, for example, in FIGS. 1, 2 and 3, includes a back section 10 and a seat section 12 hinged to one another.

As best shown in FIG. 3, each of the sections is formed of fabric sheets 14 and 16 which are sewn or otherwise secured to one another at their respective edges to form a casing A sheet of polyurethane foam 18 is enclosed in the casing, and a second sheet of polyurethane foam 20 is also enclosed in the casing in front of sheet 18, with the two sheets being glued to one another. Sheet 18, for example, may have a thickness of ½ inch and sheet 20 may have a thickness of 1 inch. Only sheet 20 may be used in the seat section, if so desired.

An inflatable bladder member 22 is mounted in the seat section 14 between the sheets 18 and 20, and it is glued in place between the sheets. The inflatable member 22 is positioned to be located at the lower lumbar region of a person seated on the cushion.

An inflater bulb 26 is coupled to the inflatable member by an appropriate tube 28. As best shown in FIG. 4, the inflatable member 22 may take the form of a bladder having a sealed peripheral edge 22A.

If so desired, the front sides of the back and seat sections of the cushion may be covered in simulated sheepskin, as shown in FIG. 1.

Elastic restraints 30 and 32, as best shown in FIGURE 2, are secured at their ends to the side edges of the back section 10, and are used to secure the cushion, for example, to a bucket seat in a motor vehicle.

In addition, tuck-in bottom restraints 34–36 are secured to the sides of the cushion adjacent to the location It will be appreciated that while a particular embodiment of the invention has been shown and described, modifications may be made. It is intended in the claims to cover all modifications which come within the true spirit and scope of the invention.

I claim:

1. A portable cushion assembly, adapted to be releasably secured to a seat structure comprising: a seat section and a back section hinged to one another, each of said sections comprising a fabric casing and a pair of generally continuous foam sheets filling said casing and supported thereby; and an inflatable member positioned between said foam sheets and forming an air chamber mounted in said back section whereby its supports the lower lumbar region of an individual seated on the cushion assembly.

2. The cushion assembly defined in claim 1, in which said said sheets comprise polyurethane foam.

3. The cushion assembly defined in claim 1, in which the front side of the back and seat sections is covered with a simulated sheep-skin material.

4. The cushion assembly defined in claim 1, and which includes at least one elongated elastic restraint member secured at its ends to the edges of the back section and extending around the rear side thereof.

5. The cushion assembly defined in claim 1, and which includes a pair of bottom restraints secured to the respective edges of the assembly at the portion thereof where the seat and back sections are hinged to one another.

6. The cushion assembly defined in claim 1, and which includes a hand-operated inflater bulb, and an air tube coupling the bulb to the inflatable member.

7. A portable, cushion assembly adapted to be releasably secured to a seat structure comprising a fabric casing and a pair of generally continuous sheets or foam material filling said casing and supported thereby; and an inflatable member forming an air chamber mounted between said foam sheets in a back, whereby it supports the lower lumbar region of a seated individual using the cushion assembly.

* * * * *